(No Model.) 2 Sheets—Sheet 1.

F. D. OWEN.
BICYCLE.

No. 323,066. Patented July 28, 1885.

Witnesses: Inventor, (No Model.) 2 Sheets—Sheet 2.

F. D. OWEN.
BICYCLE.

No. 323,066. Patented July 28, 1885.

Witnesses:

Inventor,

UNITED STATES PATENT OFFICE.

FREDERICK D. OWEN, OF WASHINGTON, DISTRICT OF COLUMBIA.

BICYCLE.

SPECIFICATION forming part of Letters Patent No. 323,066, dated July 28, 1885.

Application filed January 9, 1885. (No model.)

*To all whom it may concern:*

Be it known that I, FREDERICK D. OWEN, a citizen of the United States, residing in the city of Washington, District of Columbia, have invented certain useful Improvements in Bicycles; and I hereby declare the following to be a full, clear, and exact description of the same, reference being had to the drawings.

My invention, for which I apply for Letters Patent, is in the direction of a safety-bicycle, together with a frame of greater rigidity.

I propose to accept as my foundation the present or old form and shape of a bicycle, with one large driving-wheel going before and one following. The motive power is applied in the ordinary way to the larger or driving wheel by pedals and cranks. The frame joining the two wheels, and which is to support the rider, consists of a backbone, $b$, with a rear-wheel fork of the usual pattern. Upon the backbone are secured the spring and saddle which support the rider. The forward or larger wheel, $a$, is joined to the backbone $b$ by a triangular support, $f\,f'$, which joins the front or larger wheel at the bearings of said wheel with the backbone in a turning-point over the periphery of the wheel, and the other or after support rests against and is held in place by a sliding or rolling bearing, $p$ and $p'$, fastened rigidly to the backbone back under the saddle and spring, upon which the triangular frame passes to and fro around the forward supporting-pin, $c$, as desired in steering.

The triangular supporting-frame is my chief improvement, and may be constructed in many ways, as will be found most expedient. This support or steering-frame resembles a tetrahedron in shape, whose faces and edges are represented by a frame; but a clearer understanding may be gained by referring to the drawings. Instead of employing an upright hollow or solid fork, as is now used on most bicycles, I bifurcate the frame at or near the (forward) bearings. The first division, $f$, passes to the forward turning-point, $c$, and may occupy any position relative to the vertical line passing through the center of the hub of same wheel, while the second division, $f'$, passes aft to a horizontal arc, $g$, joined over the periphery of the wheel, and either slides or rolls under a clip, $r$, which is fastened rigidly to the backbone. These two pairs (one on each side of the wheel) of upright supports $f$ and $f'$ may be constructed either of solid iron or steel rods, or of hollow, circular, or elliptical material, as will prove most desirable. The triangular frame is now completed by joining the two uprights $f\,f'$ at the top over and free of the tire or rubber of said wheel in such a manner as to allow said frame with wheel to pass freely under the backbone. This may be best accomplished by parallel braced rods or by a semicircular curved braced sheet metallic box, $m$, fastened securely to the frame fore and aft.

The forward upright or support has an upright pin, $c$, fastened to it so that the backbone may turn freely upon it in steering. A ball-and-socket joint may be used, or a bolt may pass through both, all with the same result. The after support, $r$, is composed of a slide or roller, which is fastened securely to the backbone, forming part of the same, and at a point directly over the rear bifurcation of the frame, and rests upon the circular arc $g$, held in place by the pressure caused by the wheel's progress and by a small roller, $p'$, running in a rabbet in the arc, placed on the under side and fastened to the backbone. These two attachments to the backbone allow the steering-frame to pass easily and freely around the forward center and under the bone, the curved arched box $m$ acting and serving as a guard to the wheels and clothes of the rider. This circular arc $g$ may be continued forward radially from the forward center, $c$, and terminate with handles, the whole then serving as a handle or guide-bar. This traveler or arc $g$ may be held in place in various ways. It may pass through the backbone and rest upon anti-friction rollers or balls $l$, as may be seen from the drawings.

With this form of supporting steering-frame the handle-bar may be attached either at the forward part of the frame or turning-point, or it may be a curved semicircular bar extending forward from the rear part of the frame behind the rider, bringing the handles in the desired position, nearly in the same location relatively to the wheel and saddle as is now used.

The forward turning-pin, $c$, may be lengthened vertically on the uprights *f*, or it may be a continuation of the center pin, *v*, fastened to the backbone, extending from top down to or near the bearings, serving at the same time as one of the uprights. This, then, will take most of the strain necessary upon a steering-frame, and to further assist the frame aft may rest or hit against a roller placed on the under side of the bone by the spring-clip.

I propose also to give the handle-bar a bayonet-joint or hinge, *o*, so that, touching a spring regulated by a button in the handles or by a clamp-screw on the bar *g g'*, the bar and handles may be raised or lowered to any desired position, and can be accomplished while in motion or at rest.

The dropping of the handles is particularly necessary in racing, as it gives the rider a much better purchase on the machine, and at the same time facilitates his breathing.

Thus it will be seen that in place of small, weak, vertical centers, as now used, I gain a broad or larger bearing for the steering-wheel, which renders the bicycle not only more rigid, but will extend materially the life of the machine and pleasure of riding. This also makes a safer form of bicycle, and may be termed a "headless and safety machine."

The mechanism illustrating my invention is shown in the accompanying drawings, and is as follows:

Figure 1 is a side elevation of a bicycle constructed in accordance with my description. Fig. 2 is the forward elevation of the same, showing the curved circular arc and handle-bar more clearly.

Fig. 3 is a detailed side elevation, in which *a* is the tire, rim, and wheel, and *b* the backbone, giving the two wheels by *f* the forward and *f'* the rear upright supports of the frame. The circular horizontal arc handle *g* is joined and braced at *y y'* to the support *f'*, the whole passing under roller-bracket *r*, which is held firm by a strap, *p*, and the roller-clip *p'*. The uprights *f'* are now joined by the curved box *m*, the whole turning upon a pin or bolt, *c*.

Fig. 4 is a cross-section view through the rear sliding clip looking forward, and shows the manner of screwing the guide-bar *g'* and arc *g* to the uprights, as at *y y'*; and *m*, the guard or shield metallic box. This also illustrates the manner of attaching the handles and the bracket *r* with ball and roller bearings *l*. O and *o'* represent the bayonet-joints for lowering the bar.

Fig. 5 represents the triangular supporting-frame extended forward, with a corresponding extension in the backbone, meeting in suitable bearings, S, C, and *r*. M is the shield or guide joining the uprights, the whole frame turning around the pin or bolt *c* and through the guides at S and *r*; also, that the handle-bar may be attached at either end of the frame S or *r* or in the middle *c*, as described.

Figures 1, 2:
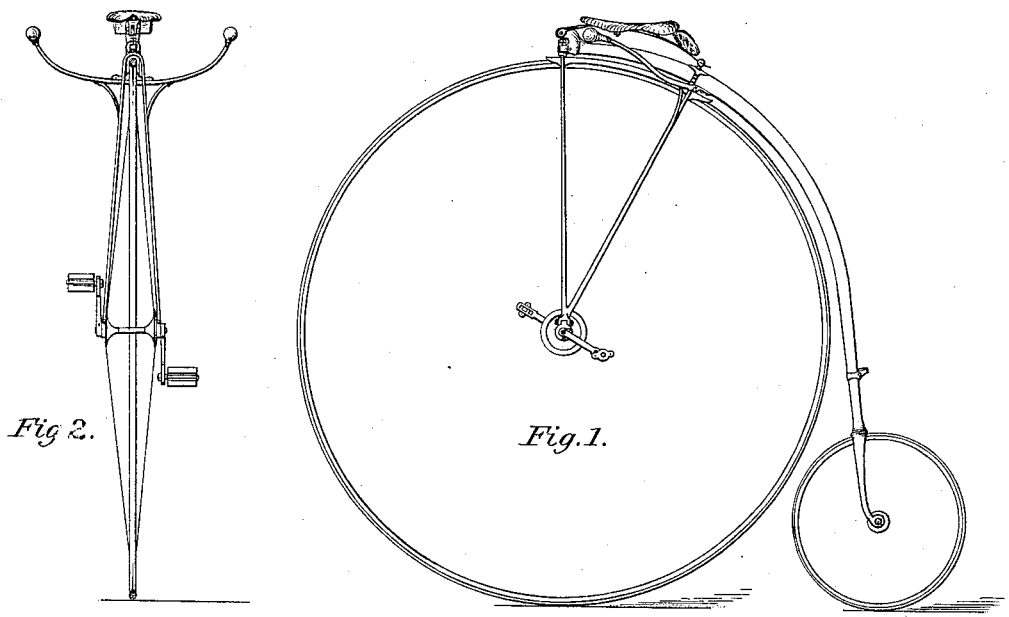
Figures 3, 4, 5, 6, 7:
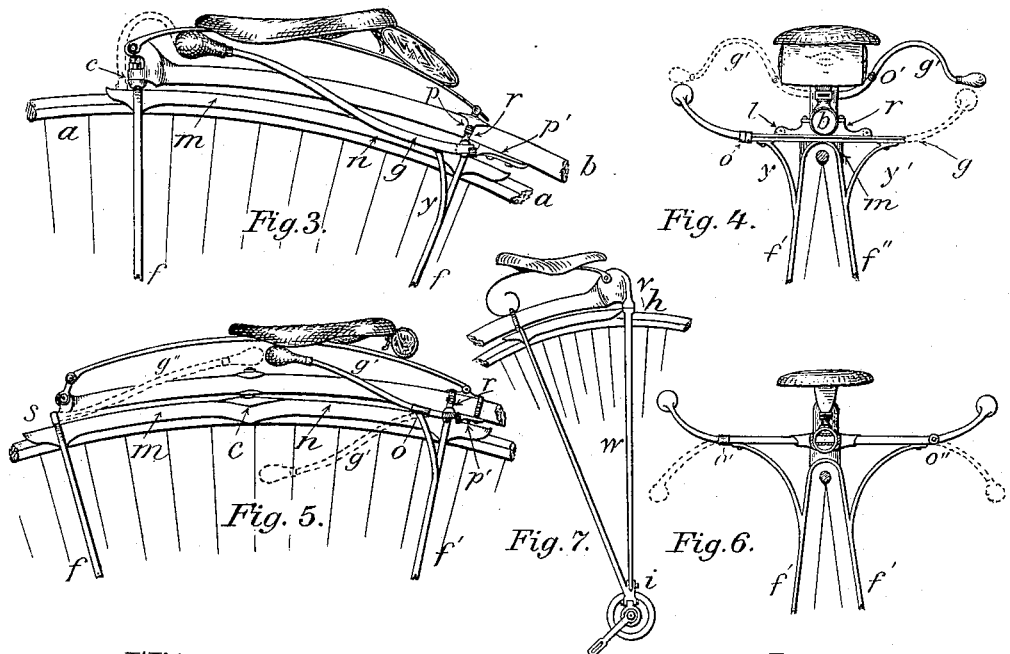
Fig. 6 is a cross-section through the rear attachment, showing how the guide-bar may pass through the backbone, which will do away with the under roller, *p'*, in Figs. 3 and 5, as it is held securely top and bottom by the channel through which it passes. Dropping the handles by means of a bayonet-joint or hinge is shown at O, Fig. 5; also by the dotted lines.
Fig. 7 illustrates the extended vertical pin *w*, forming a combination of the backbone by the curved neck *v* and journaled in bearings *h* and *i*, at the same time forming one of the uprights in the triangular frame.
Figure 8:
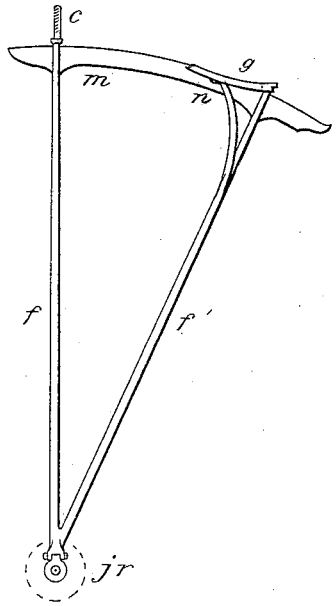
Fig. 8 illustrates a side elevation of a triangular steering-frame with journals attached at the lower vertex of *f f'*.
Figure 9:
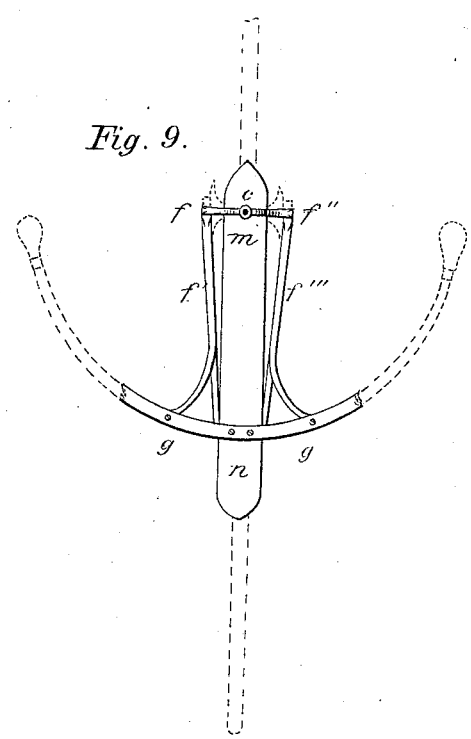
Fig. 9 illustrates a plan or top view of steering-frame, showing the application of the extension of the curved track-plate as a guide or steering bar, and terminating with handles.
Figure 10:
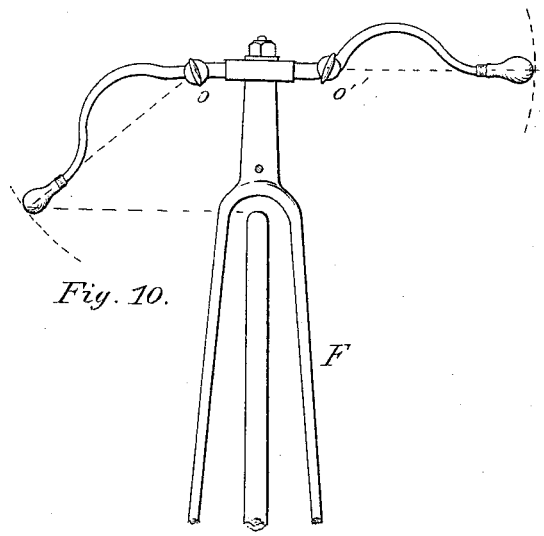
Fig. 10 illustrates the application of a movable and adjustable joint or hinge, *o*, to the guide-bar of the ordinary pattern of the steering-fork F, and how the bar and grip-handles may be adjusted as desired.
Figure 11:
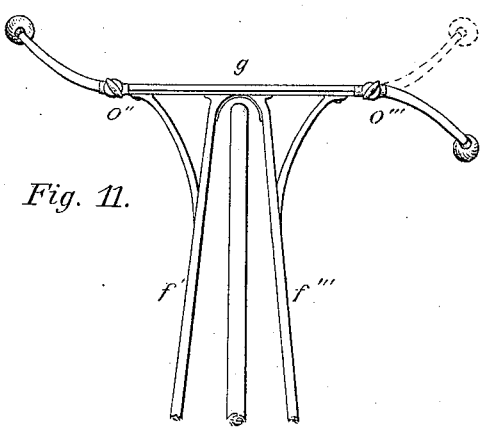
Fig. 11 shows the application of the same joint or hinge O to the curved guide-bar, coming from behind the rider, and terminating with grip-handles, all with the same result.

Having fully described my invention, what I desire to claim and secure by Letters Patent is—

1. In a bicycle, the combination, with a triangular bifurcated steering-frame joined at its vertex to the wheel-bearings, provided at point above the periphery of the wheel with a pivot, stud, or bolt, and to the rear of pin with a transverse curvilinear track-plate, of a backbone connected to said fore and aft points, and fitted so as to allow said steering-frame to turn freely around the aforesaid pin and move radially aft on a sliding or rolling attachment secured to the backbone, all substantially as described and set forth.

2. In a bicycle, the combination of a triangular bifurcated steering-frame with a curved track-plate or guide-bar extending across the frame to rear of the center turning-point, and terminating in handles in the desired position for steering, substantially as described and shown.

3. A triangular steering-frame for velocipedes, consisting of uprights *f* and *f'*, branching from the wheel-bearings, and connected at top by a brace, *m*, (one or more,) a pivot-stud above the wheel-axle, and a curved track-plate arranged to rear of said stud and concentric therewith, substantially as described.

4. In a velocipede, the combination, substantially as before set forth, of the steering-wheel, the triangular steering-frame provided with a pivot-stud, and a curved track-plate to rear of the pivot-stud, and the backbone pivoted upon the stud and abutting against the track-plate.

5. In a velocipede, the combination, substantially as set forth, of the backbone extending forward of the steering-center, and the triangular steering-frame provided with a vertical pivot-stud, and with curved track-plates to support the backbone forward and to rear of the pivot-stud.

6. In a velocipede, the combination, substantially as described, of the triangular steering-frame provided with a pivot-stud, and curved track-plate, and the backbone pivoted upon the stud, and provided with rollers to engage the track-plate.

7. In a velocipede, the combination, substantially as described, of the triangular steering-frame provided with a pivot-stud, the backbone pivoted upon the stud and provided with rollers, and the track-plate secured to the steering-frame, and moving between the rollers carried by the backbone.

8. In a bicycle, the combination, with a steering-frame, of a long extended center pin or rod joined rigidly to and forming part of the backbone by a curved neck or bend, said rod or pin to extend vertically down one side of fork or frame journaling in bearings on the upright part of said steering-frame, all substantially as described.

In testimony whereof I affix my signature in presence of two witnesses.

FREDK. D. OWEN.

Witnesses:
D. A. DENISON,
CHARLES C. TYLER.